(12) United States Patent
Goldberg et al.

(10) Patent No.: US 7,298,713 B2
(45) Date of Patent: Nov. 20, 2007

(54) METHOD AND SYSTEM FOR REDUCING MESSAGE INSTANCES

(75) Inventors: Steven Jeffrey Goldberg, Downingtown, PA (US); Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 834 days.

(21) Appl. No.: 10/428,962

(22) Filed: May 2, 2003

(65) Prior Publication Data

US 2004/0002342 A1    Jan. 1, 2004

Related U.S. Application Data

(60) Provisional application No. 60/378,718, filed on May 6, 2002.

(51) Int. Cl.
 *H04H 1/00* (2006.01)
 *H04J 3/26* (2006.01)
 *H04B 7/00* (2006.01)

(52) U.S. Cl. .................. 370/312; 370/432; 455/503; 455/519

(58) Field of Classification Search ............... 370/312, 370/432; 455/503, 519
See application file for complete search history.

(56) References Cited

U.S. PATENT DOCUMENTS

| 5,465,391 A | 11/1995 | Toeyrylae et al. |
| 5,802,465 A | 9/1998 | Hamalainen et al. |
| 5,956,648 A | 9/1999 | Brennan et al. |
| 6,122,483 A | 9/2000 | Lo et al. |
| 6,157,815 A | 12/2000 | Collins et al. |
| 6,553,228 B1 | 4/2003 | Kotzin |
| 6,633,765 B1 * | 10/2003 | Maggenti ............. 455/503 |
| 6,804,528 B1 * | 10/2004 | Laroia et al. ........ 455/503 |
| 2003/0157949 A1 * | 8/2003 | Sarkkinen et al. ... 455/503 |

FOREIGN PATENT DOCUMENTS

| EP | 1 206 072 A | 5/2002 |
| JP | 2000-138966 | 5/2000 |
| JP | 2001-053675 | 2/2001 |
| JP | 2001-217769 | 8/2001 |
| JP | 2001-236273 | 8/2001 |
| WO | 91/03037 | 3/1991 |
| WO | 99/09776 | 2/1999 |
| WO | 99/16277 A | 4/1999 |
| WO | 00/69197 | 11/2000 |
| WO | 02/01779 | 1/2002 |

OTHER PUBLICATIONS

ETSI TS 122 146, Mar. 2002.

* cited by examiner

Primary Examiner—Barry Taylor
(74) Attorney, Agent, or Firm—Volpe and Koenig, P.C.

(57) ABSTRACT

A method and system for transmitting data with reduced message instances is disclosed. A wireless message network uses destination identifiers and message pointers to direct message data to multiple mobile units and avoid duplication of messages. In order to provide increased efficiency in the case of duplicate messages, a pointer to a message may be associated with multiple destination identifiers.

11 Claims, 3 Drawing Sheets

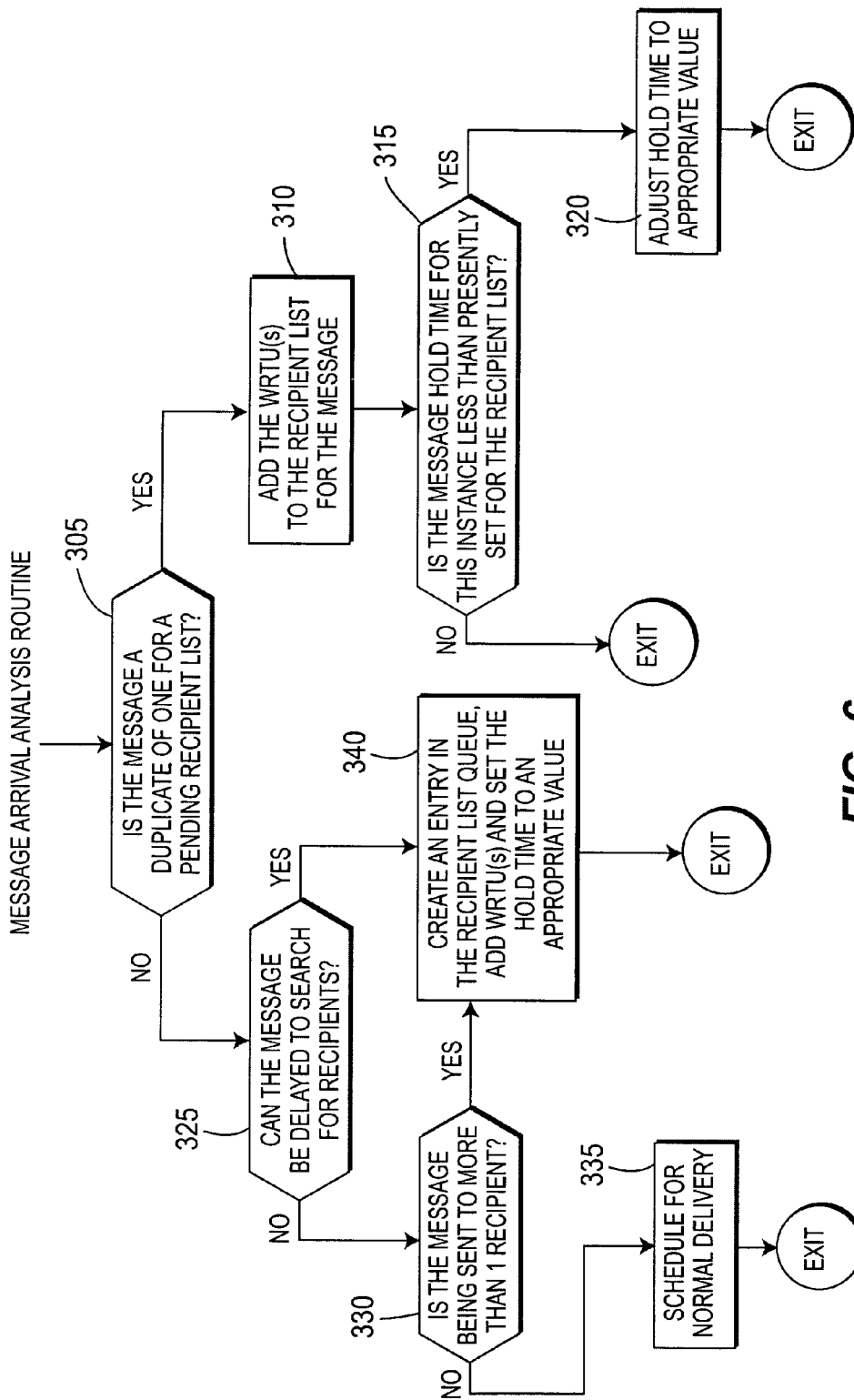

METHOD AND SYSTEM FOR REDUCING MESSAGE INSTANCES

CROSS REFERENCE TO RELATED APPLICATION

This application claims priority from U.S. Provisional Application No. 60/378,718, filed on May 6, 2002, which is incorporated by reference as if fully set forth.

FIELD OF INVENTION

The present invention relates to the field of wireless communications. More particularly, the present invention relates to messaging within wireless transmission systems.

BACKGROUND

Messaging is an expanding part of wireless transmission systems. The prior art, however, fails to make efficient use of scarce radio resources with respect to the transmission of messages.

In the case of general broadcasts, messages are transmitted at a specific time, on a specific channel, with a specific channelization code. Broadcast messages are only retransmitted if there is a problem with the robustness of delivery or timing (i.e., devices typically want to receive a message while being in the right place at the right time). Broadcast messages, however, are often transmitted over large geographical regions and therefore encompass a large number of cells. For this reason, broadcasting messages is only efficient where there will be a large number of users receiving the message.

Multicasting, where messages are sent to a predetermined number of users, involves limited receivers and selective transmissions to each of the targeted receivers. In contrast to a broadcast message which is transmitted over large geographical regions, with multicasting, multiple instances of the same data (i.e., message) are transmitted, but only to the devices of the target group. Despite being more efficient than broadcasting, transmitting multiple instances of the same message is not an efficient use of radio resources. That is, with prior art multicast transmissions, messages and their associated pointers have a one-to-one correspondence which leads to multiple transmissions of the same message.

Another approach is to assign a group identifier to a number of devices. The group identifier reduces one-to-one correspondence between messages and pointers and allows a single instance of a message to be received by each device having the assigned identifier. The group identifier approach, however, is efficient only where there is prior knowledge of the devices that should form the group and the group identifier is expected to be used a number of times over a period of time. Moreover, since the group identifier must be established in the devices via offline or online programming, it is not an efficient means of ad hoc (ad hoc with respect to at least the wireless network) message delivery. That is, a group page from an email source may indeed be a repeating group, but the RF network will not have a priori knowledge of the repeating group.

Accordingly, a method and system is needed wherein a single message instance may be used for multiple recipients of the same message.

SUMMARY

The present invention is a method and system for transmitting messages with reduced message instances. A determination is made as to whether there are multiple WTRUs identified for receipt of the same message. If so, a single instance of the message may be transmitted for all of the receiving WTRUs.

BRIEF DESCRIPTION OF THE DRAWING(S)

FIG. 6 is a flow chart illustrating method steps implemented by a message arrival analysis routine in accordance with a preferred embodiment of the present invention.

DETAILED DESCRIPTION OF THE PREFERRED EMBODIMENT(S)

Figure 1:
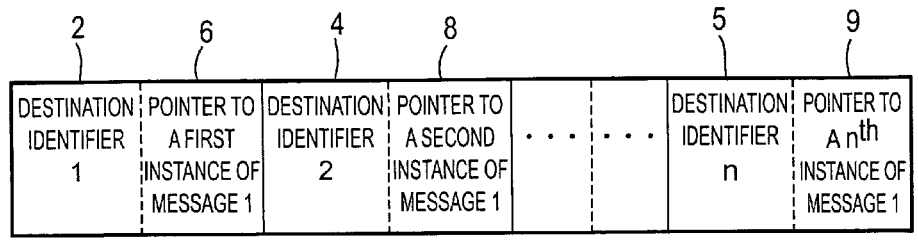
FIG. 1 is a diagram illustrating a framed time sequence having a one-to-one correspondence between messages and pointers for a plurality of WTRUs receiving the same message in accordance with the prior art.

The present invention will be described with reference to the drawing figures wherein like numerals represent like elements throughout. For purposes of describing the invention, a wireless transmit/receive unit (WTRU) may have a transmit-only, a receive-only or a transmit and receive capability. An example would be a standard pager, which can receive but not transmit messages. In the present invention, a receive ability is important to the receipt of messages, in which case the particular unit would have at least a wireless receive function. On the other hand, a WTRU capable of both transmission and reception can generally be used to receive one-way messages. Therefore, for purposes of describing the invention, a WTRU may be any device capable of receiving and/or transmitting data in a wireless environment.

Referring now to FIG. 1, a diagram illustrating the manner in which multicast messages are transmitted according to the prior art is shown. In FIG. 1 a plurality of WTRUs 2, 4, 5 are identified, using unique destination identifiers, for receipt of the same message, message 1. In the prior art, a separate instance of the message 1 is provided for each WTRU (see WTRU 2 and pointer 6, WTRU 4 and pointer 8, and WTRU 5 and pointer 9). Consequently, in FIG. 1, there is a one-to-one correspondence between messages and pointers.

According to the present invention, however, destination identifiers are coordinated so that only a single instance of a message is used where the same message is being sent to more than one destination identifier (i.e. to more than one WTRU(s), depending on whether the destination identifier is associated with a single WTRU or a plurality of WTRUs).

Figure 2:
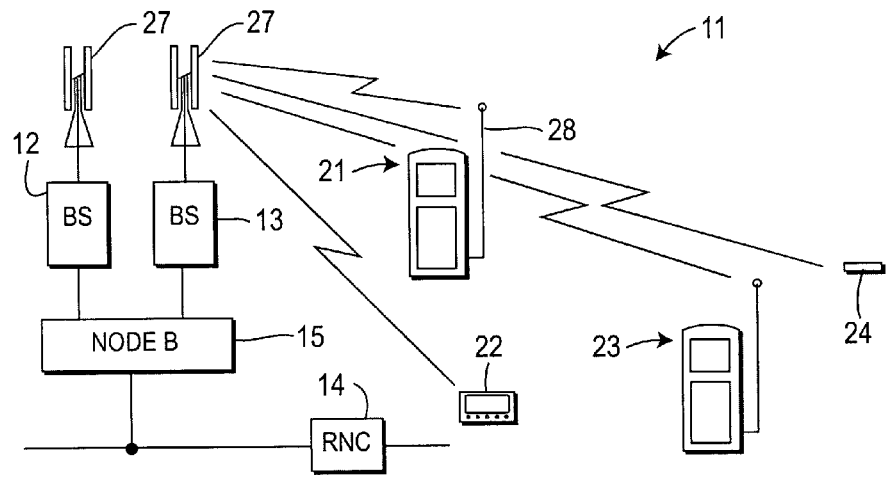
FIG. 2 is a diagram showing a mobile network in which multiple WTRUs receive messages in accordance with the present invention.

Referring now to FIG. 2, a mobile network 11 is shown. The mobile network 11 includes multiple base stations 12, 13 which are responsive to a radio network controller (RNC) 14, through one or more Node Bs 15. A plurality of WTRUs 21-24 receive messages transmitted from the network. The base stations 12, 13 transmit and receive signals via antennas 27. The WTRUs 21-24 have receivers or transceivers which receive the signals from the base stations 12, 13 (e.g., via antenna 28 of WTRU 21).

The WTRUs 21-24 can be any of a number of devices supported by the system, such as a cell phone, pager, Blackberry™ device, or a computer with a modem connection. The base stations 12, 13 are controlled by RNC 14, which performs various network supervisory and communications functions. The base stations 12, 13 provide transmit functions and signals that are transmitted to the WTRUs 21-24 within a respective cell or transmission area. A receive function is provided by each WTRU's RF stage in order to receive signals transmitted by the base stations 12, 13. In the case of two-way devices, each WTRU has both transmit and receive functions, permitting the WTRUs 21-24 to transmit data in an uplink and receive data in a downlink.

Where the network detects a single message identified for delivery to a plurality of WTRUs, say, for example, WTRUs 21 and 22, the network will refrain from transmitting a plurality of instances of the same message. Instead, WTRUs 21 and 22 will be provided with message pointers that point to the same message. Each message pointer specifies a particular physical channel and time on/at which the message will be available.

The network may detect such occurrences by evaluating a recipient list of a particular message and determining whether there are multiple WTRUs identified for receipt of a single message. WTRUs identified as being identified for receipt of a single message may be tracked using a message address status. The message address status may be WTRU specific and indicates whether a particular WTRU belongs to a group of WTRUs identified for receipt of the same message. Where there are multiple WTRUs (21 and 22) identified for receipt of the same message, a single instance of the message is transmitted to all of the receiving WTRUs. Other methods of determining and identifying which WTRUs are identified for receipt of the same message and are thus candidates for reduced message instances, are within the scope of the invention and may be implemented as desired. Examples of such methods are described below.

Figure 3:
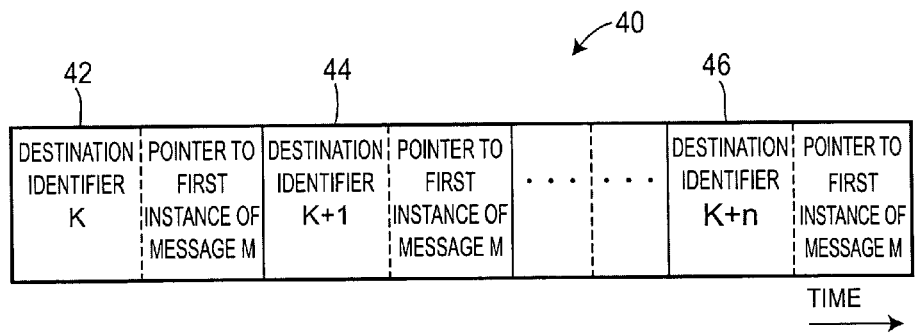
FIG. 3 is a diagram illustrating a framed time sequence wherein only a single instance of a message is transmitted despite the message being identified for delivery to a plurality of destination identifiers in accordance with the present invention.

FIG. 3 is a diagram of an ordered frame having a timing sequence 40 showing a single instance of a message, message M, being transmitted to a plurality of destination identifiers 42, 44, and 46. The destination identifiers 42, 44, and 46 may each be associated with one or more WTRUs. In this case, message "M" has been identified for delivery to the WTRU(s) associated with destination identifiers 42, 44, and 46. That is, rather than providing multiple instances of message M, a single instance is provided thereby optimizing system resources.

There is a general restriction when implementing this approach that the message must occur in a fashion such that all of the WTRUs that are receiving the message will be able to receive the message during its transmission. By way of example, the message transmission must be later than the last destination identifier time of transmission, and with sufficient time delay for every WTRU to prepare for the reception of the message.

It is important to note that the use of a pointer to a specific message may occur with any number of destination identifiers, and there may be intervening messages going to other WTRUs, as desired. Furthermore, as mentioned, one or more of the destination identifiers may actually be a group identifier of a number of WTRUs in a manner known to those skilled in the art of wireless technology.

The determination of when it is feasible to use the same message multiple times according to the present invention may be refined and adapted, as desired. That is, the determination may be implemented in a variety of embodiments.

By way of example, in a first embodiment, the source of the messages can be programmed to associate multiple receiving WTRUs with the same message. Using an email message having multiple recipients as an example, when the wireless network receives such a message it compares the recipient list against the coverage areas it has for them. Because of different locations or network affiliations it may be necessary to split the message and recipients into distinct transmissions. However if two or more of the receiving WTRUs are capable of receiving the same identification transmission and subsequently the same message transmission, then the solution of the present invention may be utilized.

In a second embodiment, where messages and data concerning receiving WTRUs enter a wireless network individually, many types of messages can tolerate some delay in delivery without adverse effects. In this case, the system compares messages over some fraction of these allowable delay times for duplications. This can often be done with minimal calculations through such techniques as hashing functions. When duplications are detected, a check is done to determine if any of the duplicated messages may be transmitted in a single transmission. If so, pointers that point to a single instance of a duplicated message is provided for the WTRUs identified for receipt of the duplicated message.

In a third embodiment, a wireless system may include an entity for monitoring transmissions to WTRUs. The entity establishes a likelihood factor concerning whether certain groups of WTRUs receive transmissions of the same messages. The reception of a message for one of these WTRUs triggers a delay and search for duplications of the message for other devices before transmission thereof. If duplications are detected, a single instance of the message is transmitted. Otherwise, separate instances of the message are transmitted to each of the receiving WTRUs.

In a fourth embodiment, a wireless system is preprogrammed to watch for specific device identifier groups and checks for duplication of messages to the individuals within these groups. If duplications are detected, a single instance of the message is transmitted. Otherwise, separate instances of the message are transmitted to each of the receiving WTRUs.

To implement the present invention in 3rd generation (3GPP) cellular networks, the destination identifiers and pointers identified in FIG. 3 are signaled on the broadcast common control channel (BCCH) or an equivalent logical control channel broadcast to all users of the cell. The BCCH or equivalent logical control channel is mapped to a broadcast transport channel (BCH) or an equivalent broadcast transport channel that is applied to the primary common control physical channel (PCCPCH). Alternatively, the BCCH or an equivalent logical control channel can be mapped to a forward access channel (FACH) that is applied to the secondary common control physical channel (SC-CPCH).

In FIG. 3, a WTRU must check the entire timing sequence 40 to determine whether there is a message for them. To provide more efficient processing and reduced battery consumption in a WTRU, it is necessary to provide deterministic scheduling of the destination identifiers and pointers. Furthermore, it is necessary to signal logically separate information (i.e. the destination identifiers and pointers) independently since the need to acquire the information and the periodicity of signaling will be unique to the signaling information being signaled. Therefore, in another embodiment of the present invention, the destination identifiers and pointers are maintained in unique System Information Blocks (SIB). In this embodiment, therefore, the destination identifiers and pointers are associated with particular SIBs thereby allowing WTRU(s) to simply determine which individual SIB they should read in order to receive a message. That is, the list of destination identifiers and pointers can be relatively large. To avoid having a WTRU check each destination identifier and pointer contained within a timing sequence (such as timing sequence 40), the SIB information can be segmented into multiple independent transmissions. Alternatively, it is also possible to separate different classifications of destination identifiers and pointers into multiple SIBs.

WTRUs may determine which SIB to read from a master information block (MIB) that identifies the scheduling of individual SIBs. That is, in this embodiment, instead of a WTRU checking all of the destination identifiers and pointers contained within a particular timing sequence (such as timing sequence 40), the WTRU may simply check the MIB to quickly determine the appropriate destination identifier and pointer (which are contained in the SIB). The destination identifiers and pointers are therefore associated with a particular SIB. Users may then only acquire SIBs for which services these users are associated with.

Figure 4:
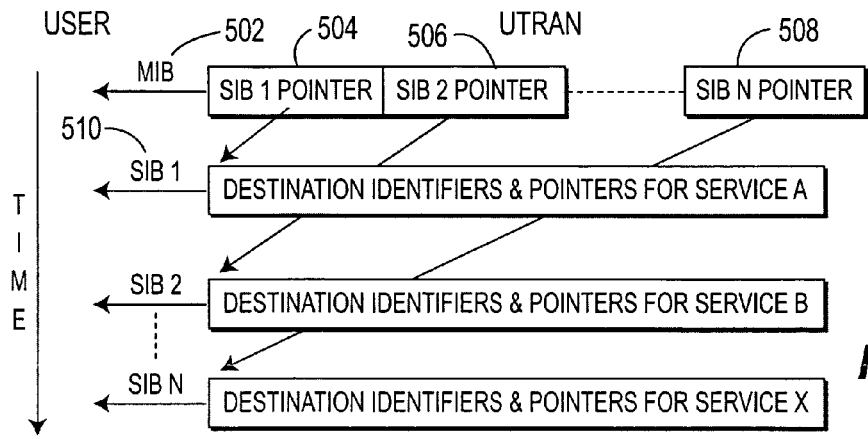
FIG. 4 is a diagram for more efficiently processing destination identifiers and pointers contained within a framed time sequence.

To illustrate this embodiment, reference is made to FIG. 4. In FIG. 4, a MIB 502 including pointers 504, 506, and 508 is shown. It should be noted that the MIB may be unique for each cell. Therefore, each time a WTRU enters a cell, they will read the MIB. By reading the MIB 502 the WTRU is informed of where to find their SIB. The SIB informs the WTRU at which time interval the WTRU's destination identifier and pointer will be presented. It should also be noted that the destination identifier and pointer may be updated periodically. For example, in the case of stock quotes, a new message may be transmitted every 10 minutes. In that case, the WTRU will read the SIB every 10 minutes to receive the updated information, but does not have to read the MIB. This is because the MIB will not change unless the actual scheduling of the destination identifiers and pointers changes.

For example, still referring to FIG. 4, the MIB 502 includes pointers 504, 506, and 508 which point to SIB1 SIB2, and SIBN, respectively. A WTRU subscribing to service A reads the MIB, and is directed to SIB1 510. From reading SIB1 510, the WTRU reads the destination identifiers and pointers for service A 512. The WTRU may then retrieve messages for service A. In this embodiment, any number of WTRUs may be associated with the destination identifiers for service A (i.e. all of the users subscribing to service A). Therefore all of the WTRUs that subscribe to service A, by reading the MIB and the SIB, are directed to a single instance of whatever message is being transmitted as part of service A. WTRUs associated with services B and X may similarly be directed to single instances of messages transmitted pursuant to those services.

Figure 5:
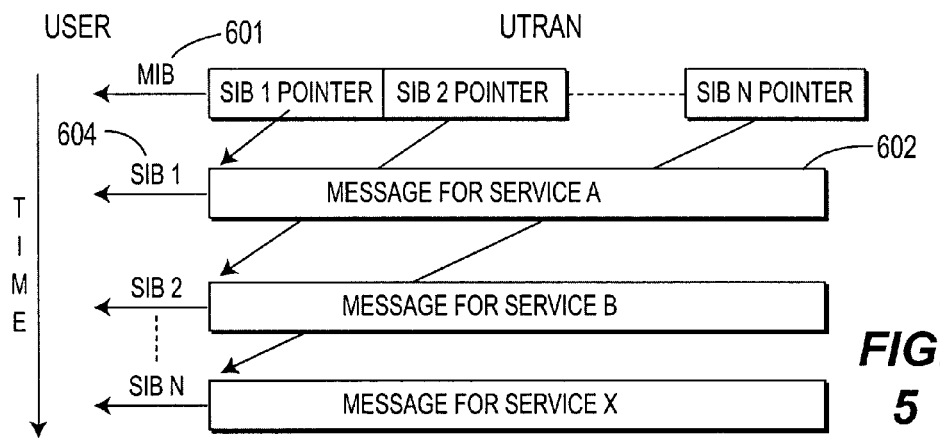
FIG. 5 is a variation of the diagram shown in FIG. 4 wherein messages are included directly in the SIBs.

The embodiment discussed above and shown in FIG. 4 may be varied so that the actual message is included in the SIB, as shown in FIG. 5. In FIG. 5, a WTRU reads the MIB as before, but here an extra step is eliminated because when the WTRU obtains its SIB it has an actual message. This also enables a single instance of the message to be transmitted for multiple WTRUs. That is, each WTRU reads MIB 601 and is directed to SIB1 604 which includes a single instance of the message 602 currently being transmitted for service A.

It should be noted that it is possible to provide multiple levels of pointers and messages. Thus, it is possible to include a generic message pointer, such as a pointer to a message indicating availability of a more specific type of message. The user can then, either by preconfiguration or by selection at the time of receipt of the generic message, choose to receive the specific type message. The selection can be made to inform the network that the WTRU will receive the message, or the selection can be passive, allowing the WTRU to respond to the more specific message. By way of example, a user entering a commercial space may be offered commercial information such that the user may elect to receive the commercial information.

FIG. 6 is a flow chart illustrating method steps implemented by a message arrival analysis routine in accordance with a preferred embodiment of the present invention. When a message arrives, a determination is made as to whether the message is a duplicate of one for a pending recipient list (step 305).

If the determination of step 305 yields a positive result, the WTRU(s) are added to the recipient list for the message (step 310). In step 315, a determination is made as to whether the maximum hold time for this instance is less than that presently set for the recipient list. If it is, the hold time is adjusted to an appropriate value (step 320).

If the determination of step 305 yields a negative result, a determination is made as to whether the message can be delayed to search for other recipients (step 325). If the message can not be delayed to search for other recipients, a determination is made as to whether the message is being sent to more than one recipient (step 330). If the message is not being sent to more than one recipient, the message is scheduled for normal delivery (step 335). If the message is being sent to more than one recipient, or it is determined that the message can be delayed to search for other recipients, an entry is created in the recipient list queue, one or more WTRUs are added, and the hold time is set to an appropriate value (step 340).

Figure 7:
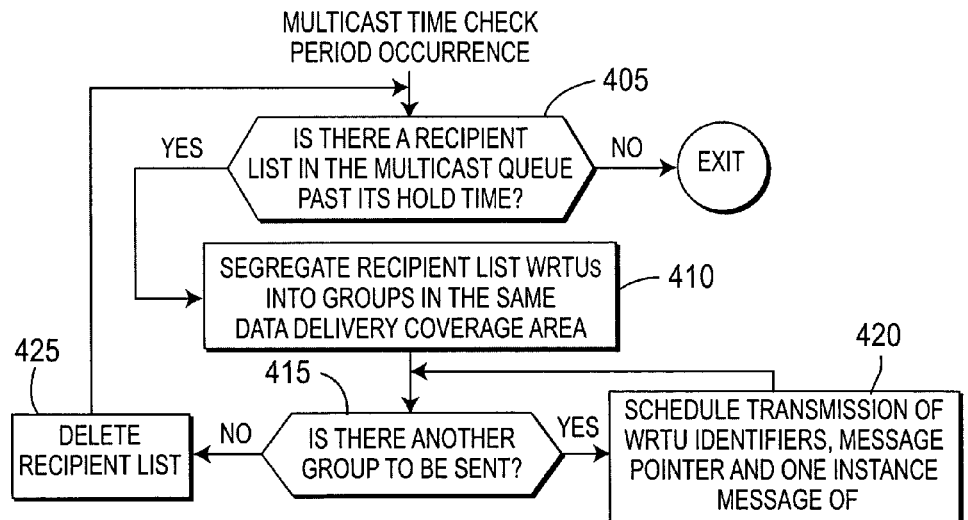
FIG. 7 is a flow chart illustrating method steps for periodically checking to see if there is a recipient list that has been in a multicast queue past a predetermined hold time in accordance with a preferred embodiment of the present invention.

FIG. 7 is a flow chart illustrating method steps for periodically checking to see if there is a recipient list that has been in a multicast queue past a predetermined hold time in accordance with a preferred embodiment of the present invention. When it is determined that a recipient list remains in the multicast queue past its hold time (step 405), the WTRUs on the recipient list are segregated into groups in the same data delivery coverage areas (step 410). A determination is then made as to whether there is another group to send (step 415). If there is another group to send, the transmission of WTRU identifiers, message pointer and one instance of the message is scheduled (step 420). If there is not another group to send, the recipient list is deleted (step 425).

While the present invention has been described in terms of the preferred embodiment, other variations which are within the scope of the invention as outlined in the claims below will be apparent to those skilled in the art.

What is claimed is:

1. A method of processing an incoming message in a wireless communications network, the network comprising a plurality of wireless transmit/receive units (WTRUs) and at least one recipient list associated with at least one message, the method comprising:
   (a) determining whether the incoming message is a duplicate of a message associated with the recipient list;
   (b) if the incoming message is a duplicate of a message associated with the recipient list as determined in step (a), identifying a message address status of one or more WTRUs for the incoming message, wherein the message address status indicates whether a WTRU is identified for receipt of the incoming message, and adding the identity of the WTRUs that are not already on the recipient list to the recipient list;
   (c) assigning destination identifiers and pointers in a frame format which associates the added WTRUs to the message associated with the recipient list;
   (d) adjusting a message transmission time delay parameter used by the network such that each of the WTRUs has sufficient time to prepare for the reception of the incoming message; and
   (e) transmitting a single instance of the incoming message to all WTRUs identified for receipt of the incoming message.

2. The method of claim 1, further comprising:
   broadcasting an ordered frame over a logical control channel to associate the messages with the WTRUs, the ordered frame including destination identifiers and pointers to the messages that respective ones of the WTRUs are to receive;
   mapping the logical control channel to a broadcast transport channel that is applied to a primary common control physical channel (PCCPCH);
   maintaining the identifiers and pointers in unique system information blocks (SIBs); and maintaining scheduling information associated with the SIBs in a master information block (MIB), wherein the WTRUs acquire the SIBs to determine the destination identifiers and pointers.

3. The method of claim 2 wherein different classifications of the destination identifiers and pointers are separated into multiple SIBs.

4. The method of claim 1, further comprising:
   broadcasting an ordered frame over a logical control channel to associate the messages with the WTRUs, the ordered frame including destination identifiers and pointers to the messages that respective ones of the WTRUs are to receive;
   mapping the logical control channel to a forward access channel (FACH) that is applied to a secondary common control physical channel (SCCPCH);
   maintaining the identifiers and pointers in unique system information blocks (SIBs); and
   maintaining scheduling information associated with the SIBs in a master information block (MIB), wherein users of the WTRUs acquire SIBs to determine the destination identifiers and pointers.

5. The method of claim 4 wherein different classifications of the destination identifiers and pointers are separated into multiple SIBs.

6. The method of claim 4 further comprising the step of providing messages in the SIBs.

7. A network capable of associating messages with a plurality of WTRUs for receipt thereof, the network comprising:
   means for broadcasting an ordered frame over a logical control channel to associate the messages with the WTRUs, the ordered frame including destination identifiers and pointers to the messages that respective ones of the WTRUs are to receive;
   means for mapping the logical control channel to a broadcast transport channel that is applied to a primary common control physical channel (PCCPCH);
   means for maintaining the identifiers and pointers in unique system information blocks (SIBs); and
   means for maintaining scheduling information associated with the SIBs in a master information block (MIB), wherein the WTRUs acquire the SIBs to determine the destination identifiers and pointers.

8. The network of claim 7 wherein different classifications of the destination identifiers and pointers are separated into multiple SIBs.

9. A network capable of associating messages with a plurality of WTRUs for receipt thereof, the network comprising:
   means for broadcasting an ordered frame over a logical control channel to associate the messages with the WTRUs, the ordered frame including destination identifiers and pointers to the messages that respective ones of the WTRUs are to receive;
   means for mapping the logical control channel to a forward access channel (FACH) that is applied to a secondary common control physical channel (SCCPCH);
   means for maintaining the identifiers and pointers in unique system information blocks (SIBs); and
   means for maintaining scheduling information associated with the SIBs in a master information block (MIB), wherein users of the WTRUs acquire SIBs to determine the destination identifiers and pointers.

10. The network of claim 9 wherein different classifications of the destination identifiers and pointers are separated into multiple SIBs.

11. The network of claim 9 wherein messages are included in the SIBs.

* * * * *